United States Patent [19]
Crosby

[11] Patent Number: 5,113,493
[45] Date of Patent: May 12, 1992

[54] FULL SPEED ANIMATION SYSTEM FOR LOW-SPEED COMPUTERS AND METHOD

[75] Inventor: C. Scott Crosby, Greer, S.C.

[73] Assignee: Liberty Life Insurance Co., Greenville, S.C.

[21] Appl. No.: 48,553

[22] Filed: May 11, 1987

[51] Int. Cl.⁵ ............................................... G06F 3/14
[52] U.S. Cl. .................................... 395/152; 340/725; 340/728
[58] Field of Search ................ 364/518, 521; 340/725, 340/701, 703, 709, 724, 726, 747; 358/343

[56] References Cited

U.S. PATENT DOCUMENTS

| | | | |
|---|---|---|---|
| 3,747,087 | 7/1973 | Harrison et al. | 340/725 X |
| 4,600,919 | 7/1986 | Stern | 340/725 |
| 4,698,682 | 10/1987 | Astle | 358/22 X |
| 4,700,181 | 10/1987 | Maine et al. | 340/747 |
| 4,760,390 | 7/1988 | Maine et al. | 340/747 |
| 4,797,836 | 1/1989 | Witer et al. | 364/518 |
| 4,897,806 | 1/1990 | Coor et al. | 340/725 X |

Primary Examiner—David L. Clark
Attorney, Agent, or Firm—Cort Flint

[57] ABSTRACT

Graphics display systems are used to display animated images, generated from a sequence of images (D) developed by an artist, and projected using a conditional replacement technique, in a manner as directed by a series of commands (E), given to the program by the artist. The method works for systems of any resolution and number of colors. To facilitate the process is broken into two steps, development (A) and projection (B). This eliminates all activities from the actual projection effort that do not directly contribute to it, enabling faster operation. In combination with the storage and display techniques, which only note any changes from one image to the next, this allows true animation displays not normally attainable with given equipment.

47 Claims, 13 Drawing Sheets

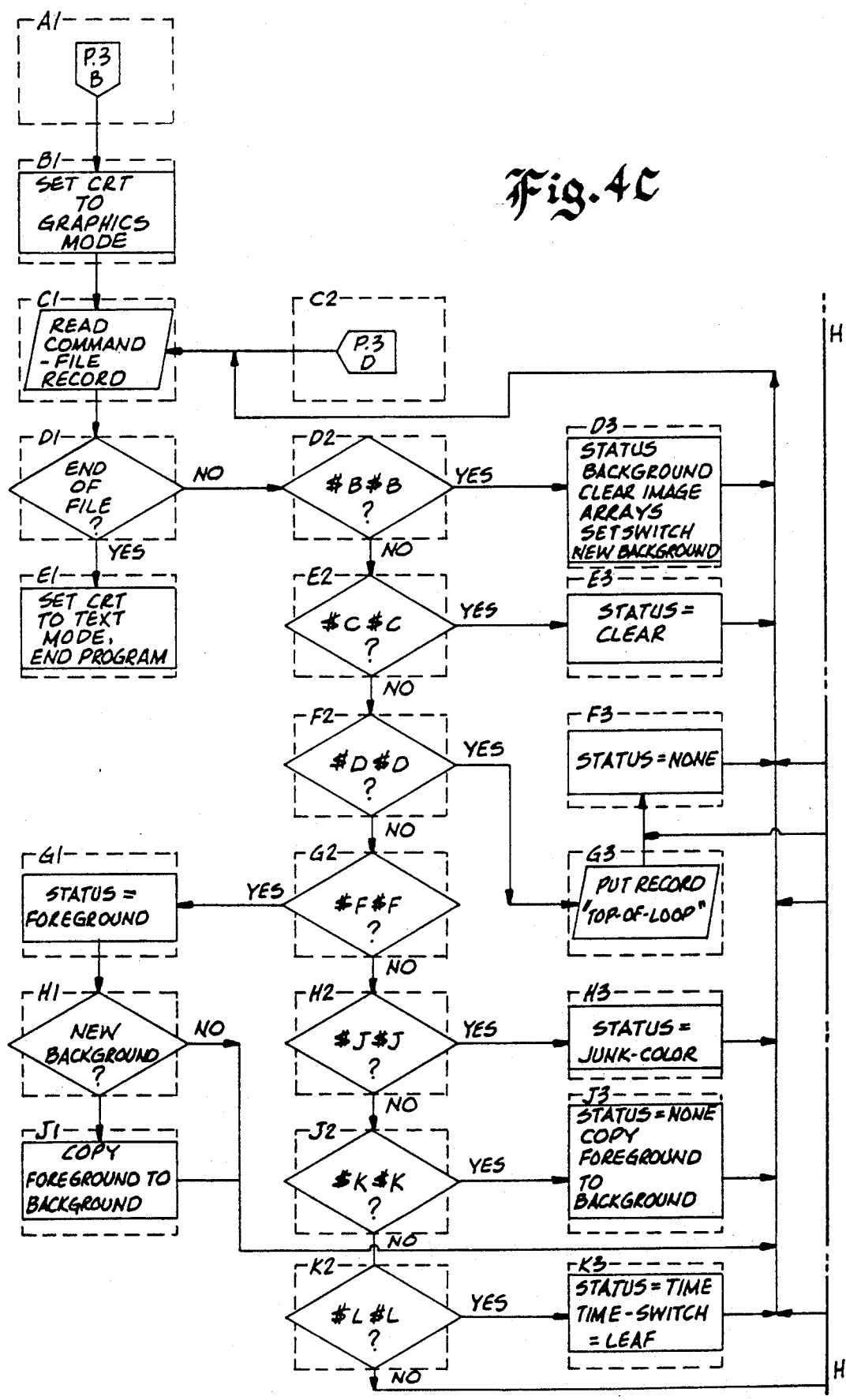

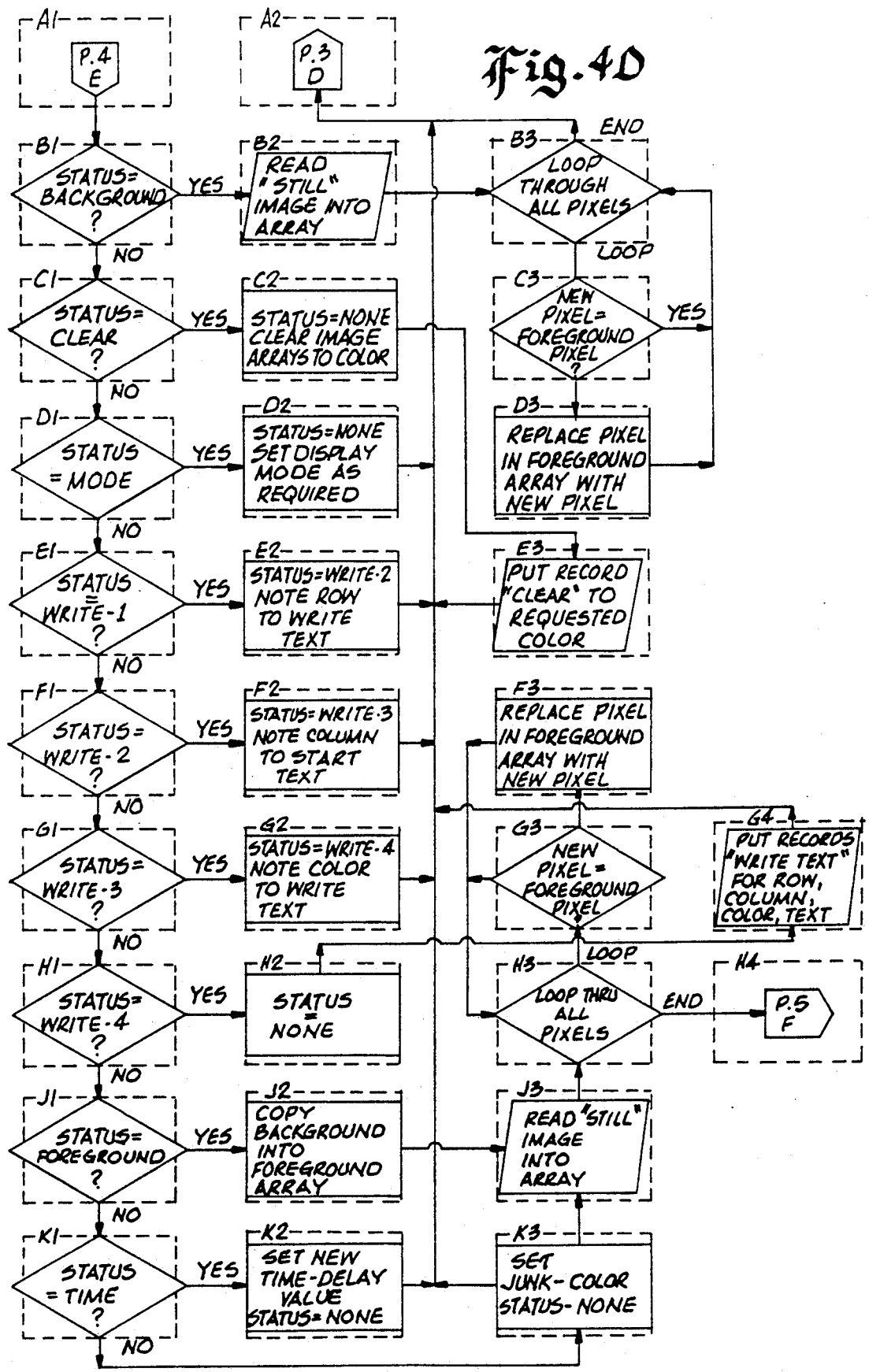

FULL SPEED ANIMATION SYSTEM FOR LOW-SPEED COMPUTERS AND METHOD

BACKGROUND OF THE INVENTION

The present invention is directed to a full speed animated graphic display specifically designed for a CRT of a personal computer where computer speed is not normally suitable for displaying true animation graphics. The speed of most personal computers allows complete change of the display about twice per second. For true animation, thirty complete changes of display are needed. Also of prime concern is the ability of the artist to use the system to build new animation scripts, without further intervention by the programmer. The animation scripts require control of the background (the still part of the picture at any given instant) and the foreground (the moving part at any instant), clearing the screen, repeating part of a script, display timing, pauses, and other factors.

The invention is suitable for bit-mapped graphic displays having images in which a large part of the image is static, with only a limited amount of movement. As the percentage of the image that is dynamic increases, the invention becomes progressively unsuitable, due to limitations on the computer's ability to maintain a visually acceptable speed of operation. The invention is applicable only to memory-mapped graphics, where a given pixel on the graphics screen in represented in a given memory location in computer memory (RAM). Depending on the number of colors available, each pixel may typically require one byte, a half-byte, two bits, one bit, or some other unit of storage.

U.S. Pat. No. 3,937,878 (Judice) discloses a bi-level (two color) graphics display system primarily concerned with a dithering process which produces grayscale images. Typically, bi-leveled systems are on/off and do not have the capability for gray tones. In Judice, each display cell is given a dither threshold value. If the signal of any given picture element is greater than the dither threshold value, then that cell is turned on. Otherwise, it is left off. As a result of this dithering process, various shades of gray appear in the reproduced image. The technique is applied to images received from a video camera. In contrast, the present invention is useful with any number of colors. The present invention separates the image development and projection processes. The artist controls the development and projection via a command file and combinations of still images he has created. Judice's technique of dithering is not applicable to the present invention. The present invention treats each color as distinct and unrelated to any other. Pixel colors and animation are produced by replacement of pixel color values rather than from threshold values.

Accordingly, an object of the invention is to provide a method and programming of computer functions on a personal computer to provide true, full-speed animated displays on a CRT.

Another object of the invention is to provide for a full-speed simulated visual display for a personal computer comprising a developer program for developing an animation file and a projector program for projecting the animated file wherein only the projector program may be run during display for fast operation and full speed animation.

Still another object of the invention is to provide a simulated visual display for a personal computer wherein a different animation script may be created by inputting a new series of still image files in accordance with commands and parameters specified by an artist and without intervention by the programmer.

SUMMARY OF THE INVENTION

Input to the system consists of two parts. The first part is a set of still images developed by the artist, each of which is in its own file. As with standard movie film, each still image is slightly altered from the previous image. The second input to the system is a single file, the command file. Here the artist designates images as background or foreground, as well as other commands such as are given below. Part of the significance of background versus foreground is the ability to overlay multiple images. Overlay is controlled through designating an image as background or foreground; background images are overlayed by foreground images. Also included in overlay logic is a designation of a "junk" color, which is not meant to be displayed, but rather to be ignored, allowing the background to "show through". This same technique (using a junk color) enables the use of multiple backgrounds (overlaid) as well. The result is a very powerful display technique capable of complex imaging at visually acceptable display speeds. The system has a single output, the displayed animation on a computer graphics screen. The system consists of two programs, the development and projection programs. These are analagous in function to the development and projection of photographic film. The developer program uses the two inputs already described to create an animation file. When read by the projection program, this animation file directs the operation of the projection program, in order to produce the desired animation as an end result. The two steps can be run at different times, places, and computers, meaning that to view the animation, only the projection program is run, using the respective records of the animation file.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The full-speed animation system for low-speed computers is comprised of a "developer program"A, "projector program" B, and structure of an "animation file" C outputted by the developer program as input for the projector program.

Use of the system begins with the running of developer program A, after individual "still-image files" D have been created and an artist's "command file" E has been written using any conventional text editor. Individual still image files D are created by the artist and are input into the computer by a suitable free form entry pad device such as a "Penpad" device manufactured by Pencepts, Inc. of Waltham, Mass. Program execution begins with the validation of the command file. Typically, a command (e.g., $F$F) sets the command status to a specific state, which then is used to select the proper edit for subsequent inputted data values. This is a simple and fairly standard parsing technique.

The validation routine (FIGS. 4A, 4G and 4B) reports any errors found. If there are errors, program execution terminates, and no animation-file development occurs. If command file E is valid, then, development of animation file C commences, guided by command file E. Still image file D consist of a number of still images each of which is a file. Command file E consists of two types of records, command records and parameter records. Animation file C consists of a number of individual pixel records, text records, and projection records which will be more fully described.

Figure 2:
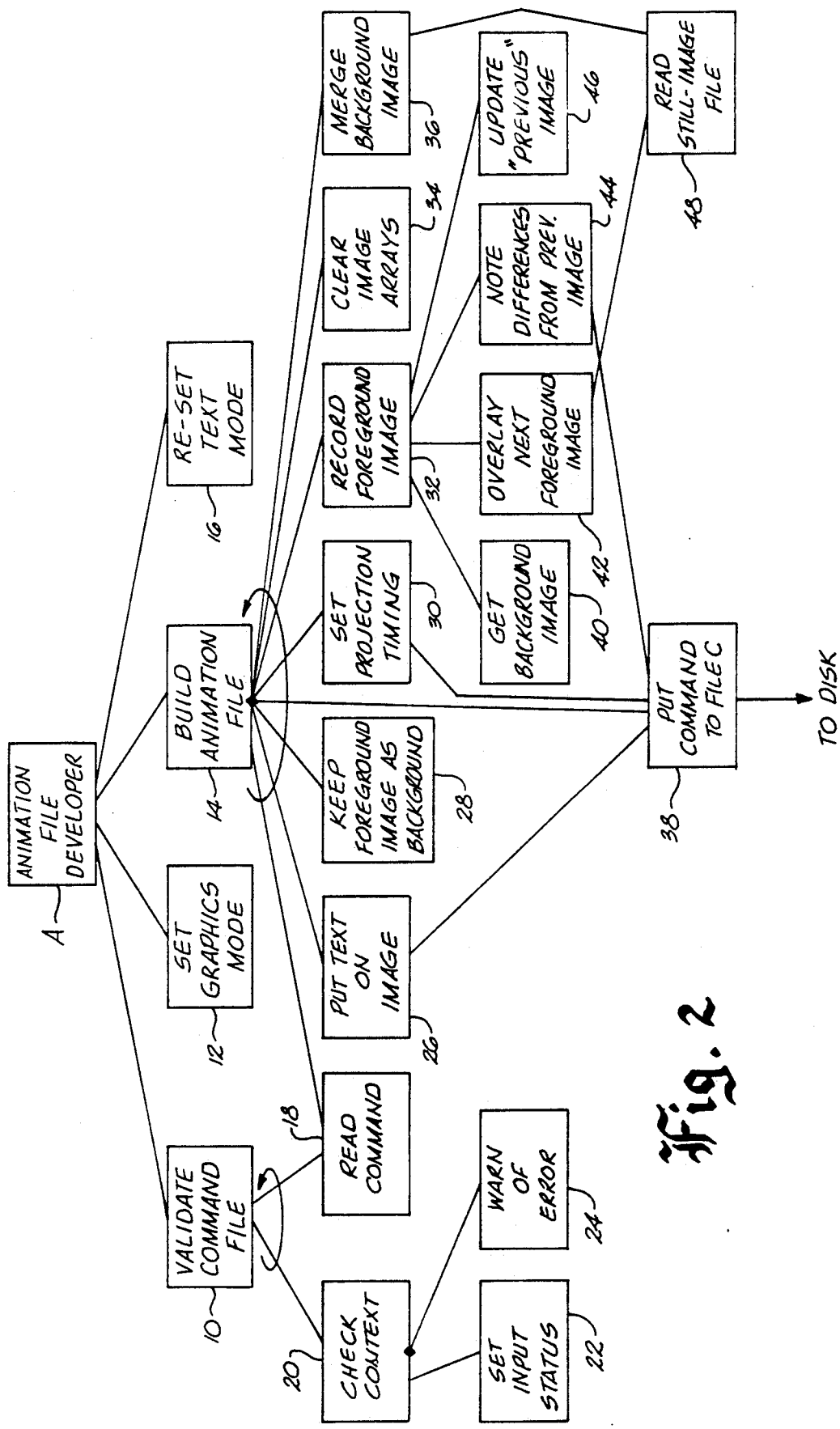
FIG. 2 is a structure chart for the developer program named in FIG. 1.

The structure chart shown in FIG. 2 describes the developer program. The overall purpose of the developer program, as shown, is to develop animation file C. This operation is broken down into four component parts: "validate the command file" 10; "set graphics mode" 12; "build animation file" 14; and "reset text mode" 16.

Validating the command file routine 10 (FIGS. 4A and 4B) refers to command file E written by the artist, which controls and directs the operation of both the developer and projector programs. This function is broken into two parts, reading a record from the command file 18, and checking its context 20. In turn, checking the context sets the input status 22 and produces an error message, if necessary. Setting the input status is used for the aforementioned context checking, in subsequent records.

Figure 4A:
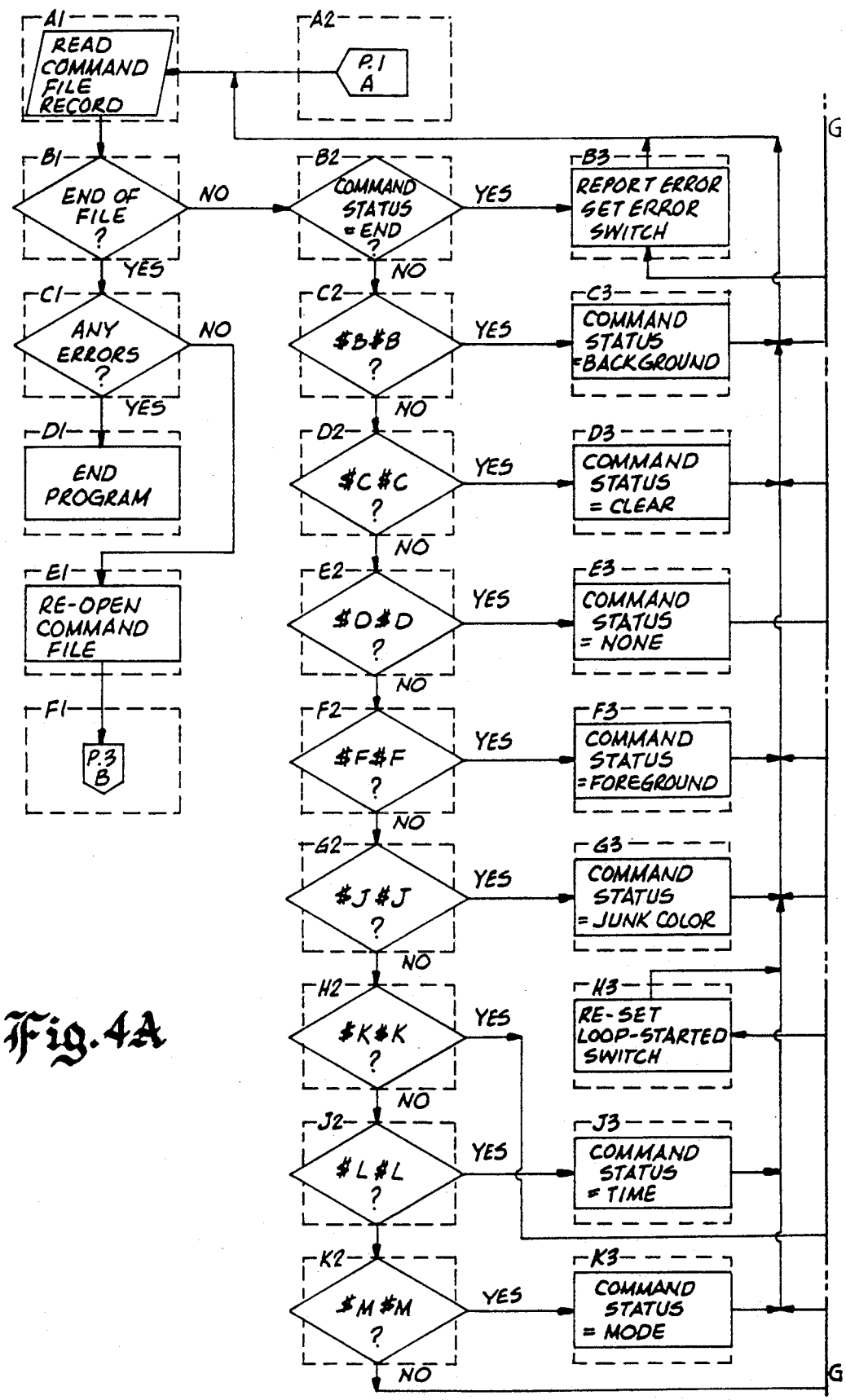
FIGS. 4A, 4G and 4B illustrate a flowchart for a validation subroutine of the developer program which validates the artist's command file.
Figure 4B:
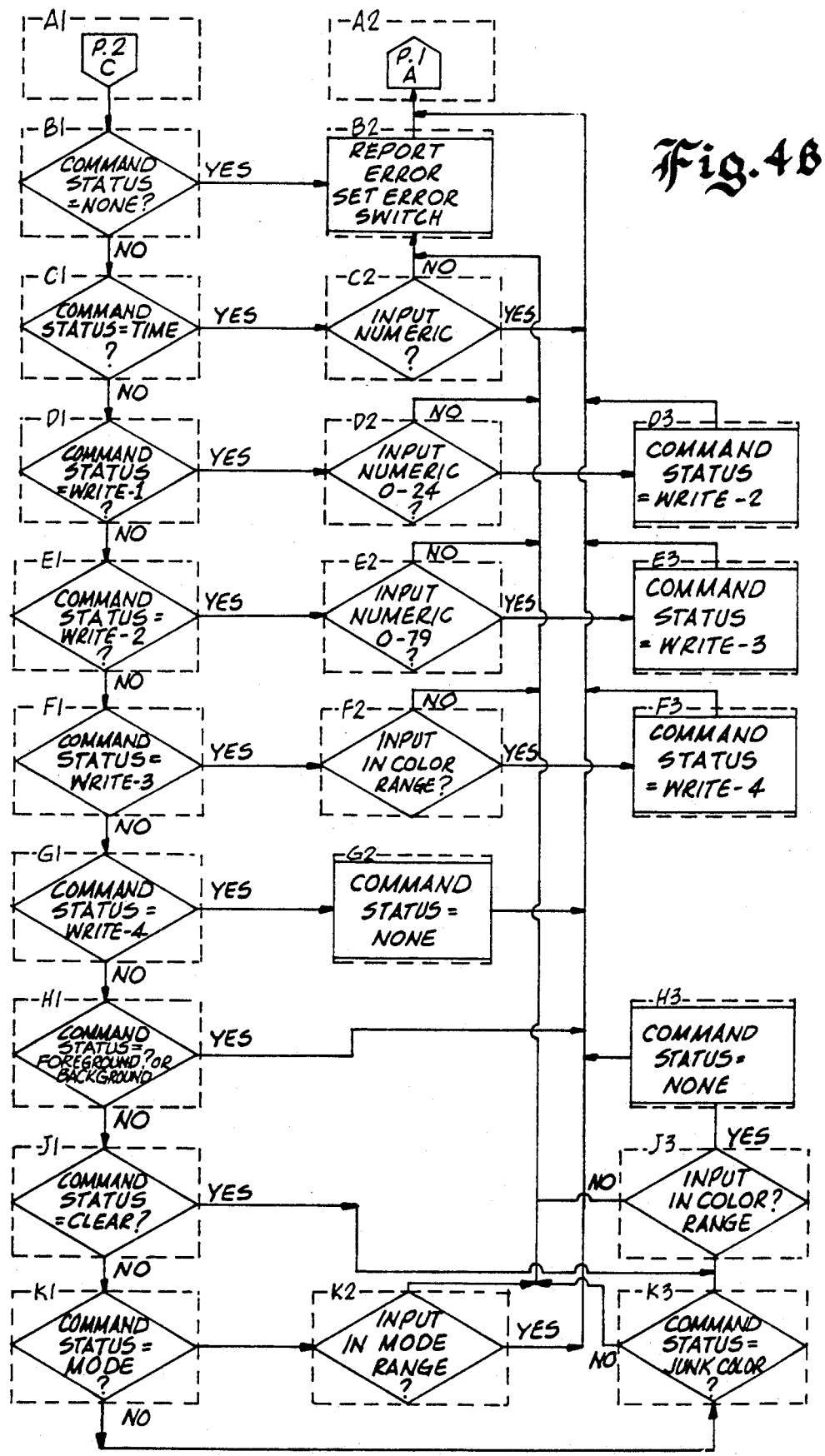
Figure 4E:
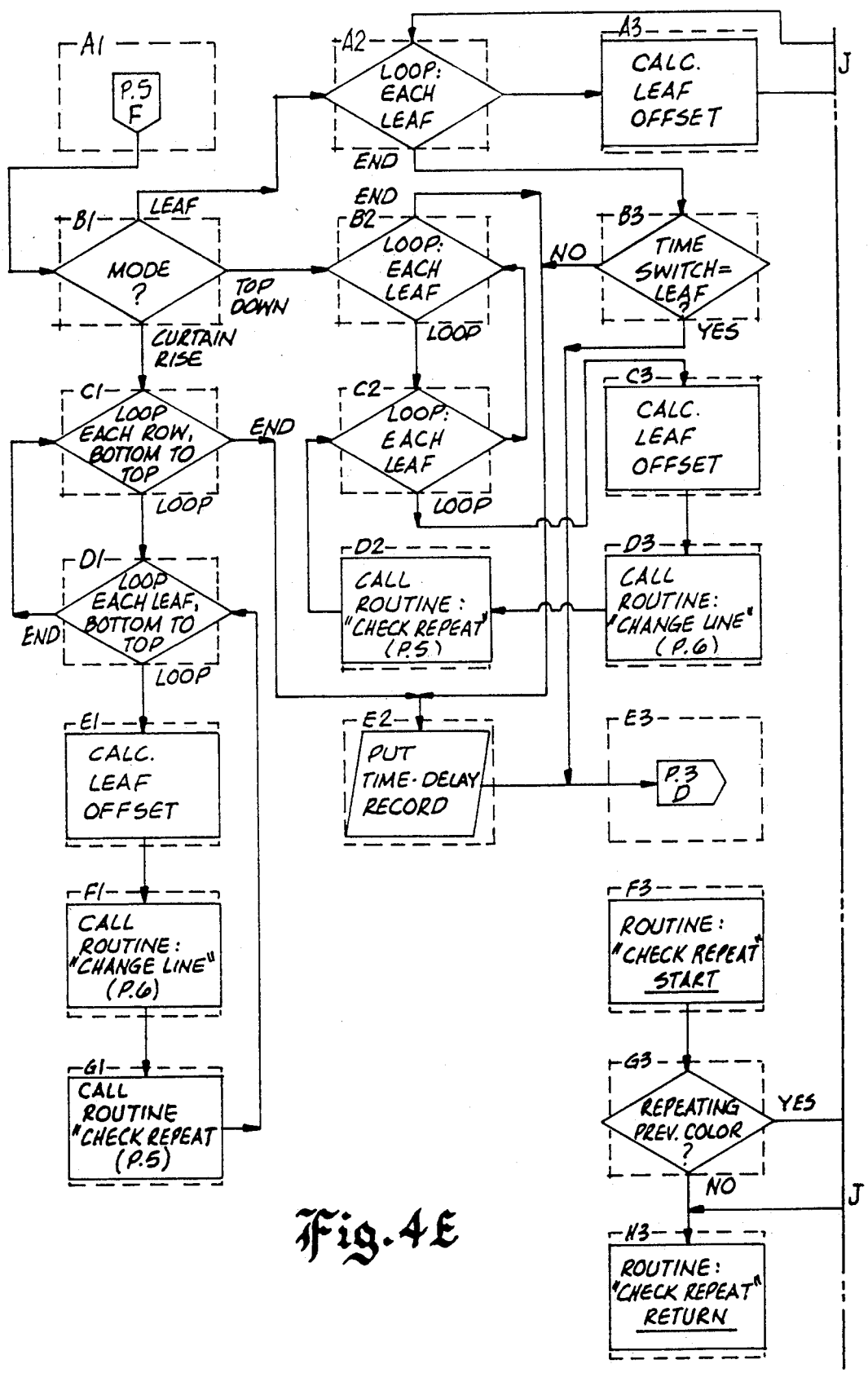
FIGS. 4C, 4H, 4D, 4E and 4J illustrate flowcharts of the main part of the developer program which create the animation file.
Figure 4F:
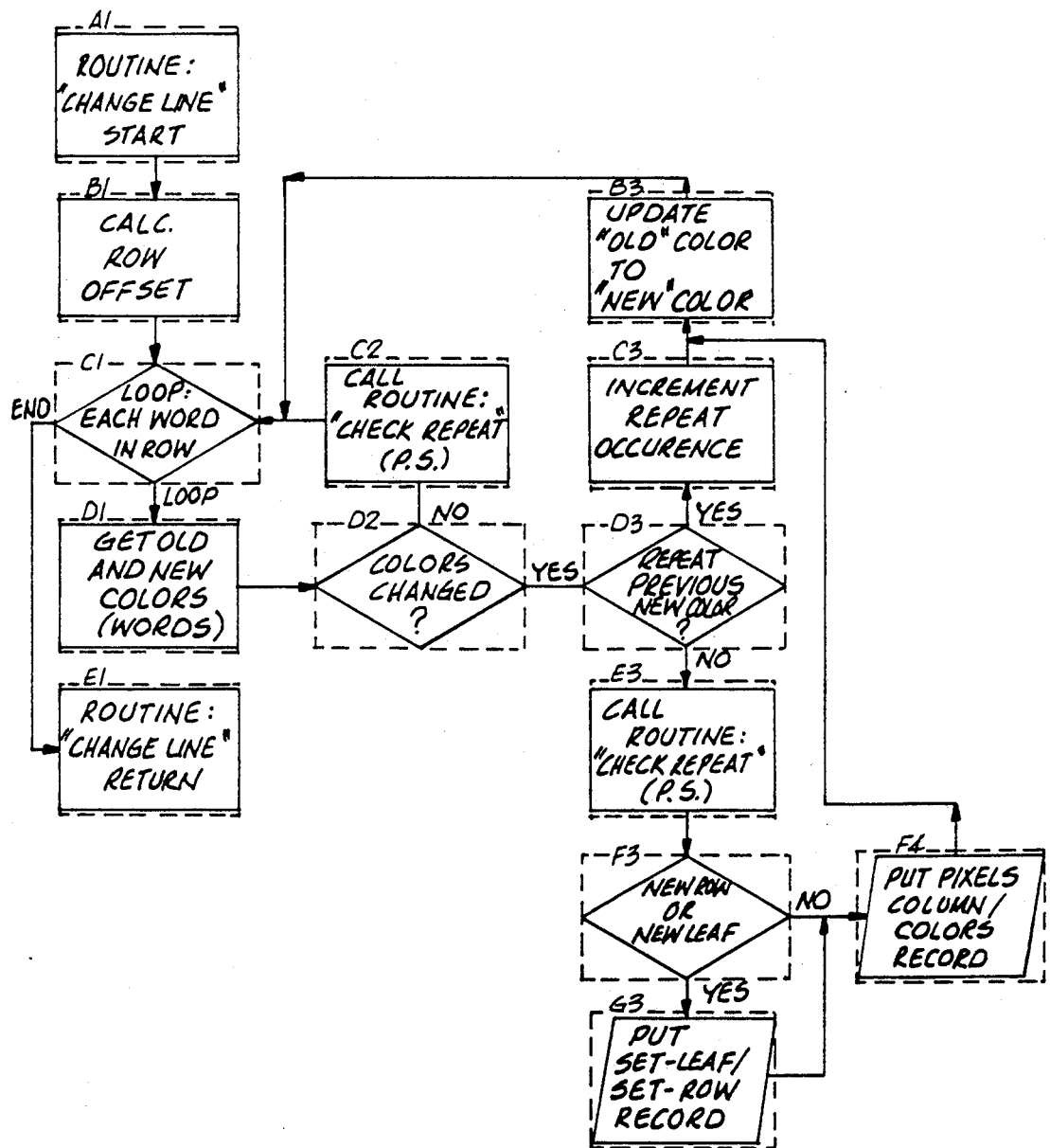
FIG. 4F illustrates a flowchart for a subroutine of the main part of the developer program which records the differences in pixels of the display by comparing previous and current still image files.
Figure 4:
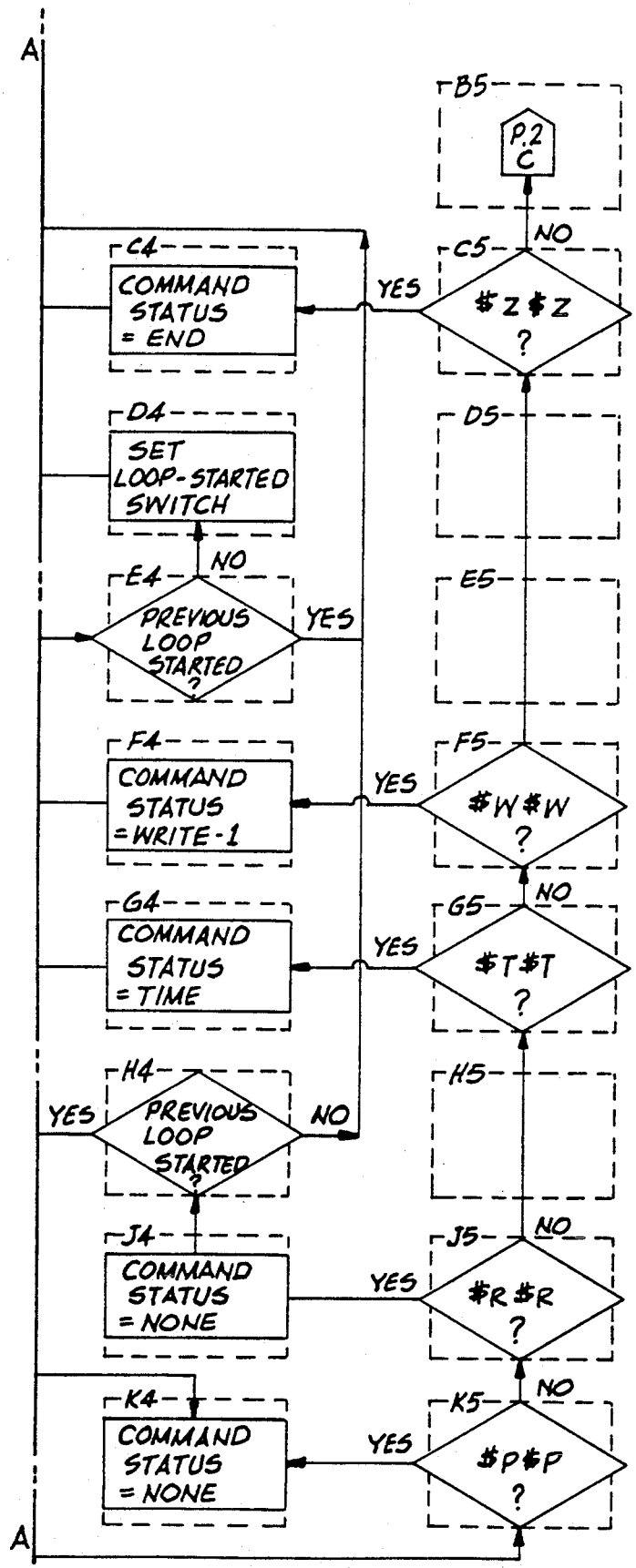
Figure 4H:
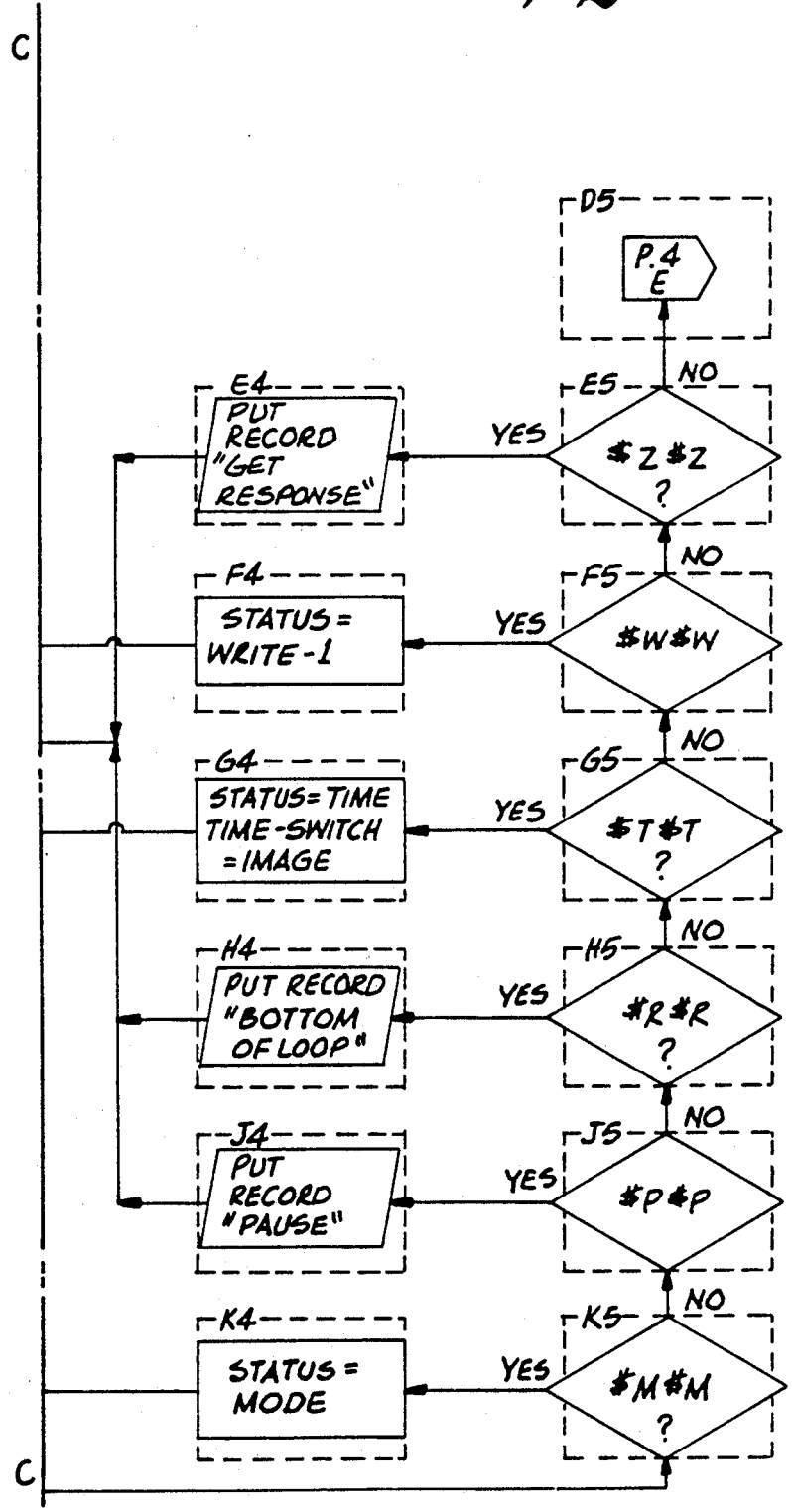
Figure 4I:
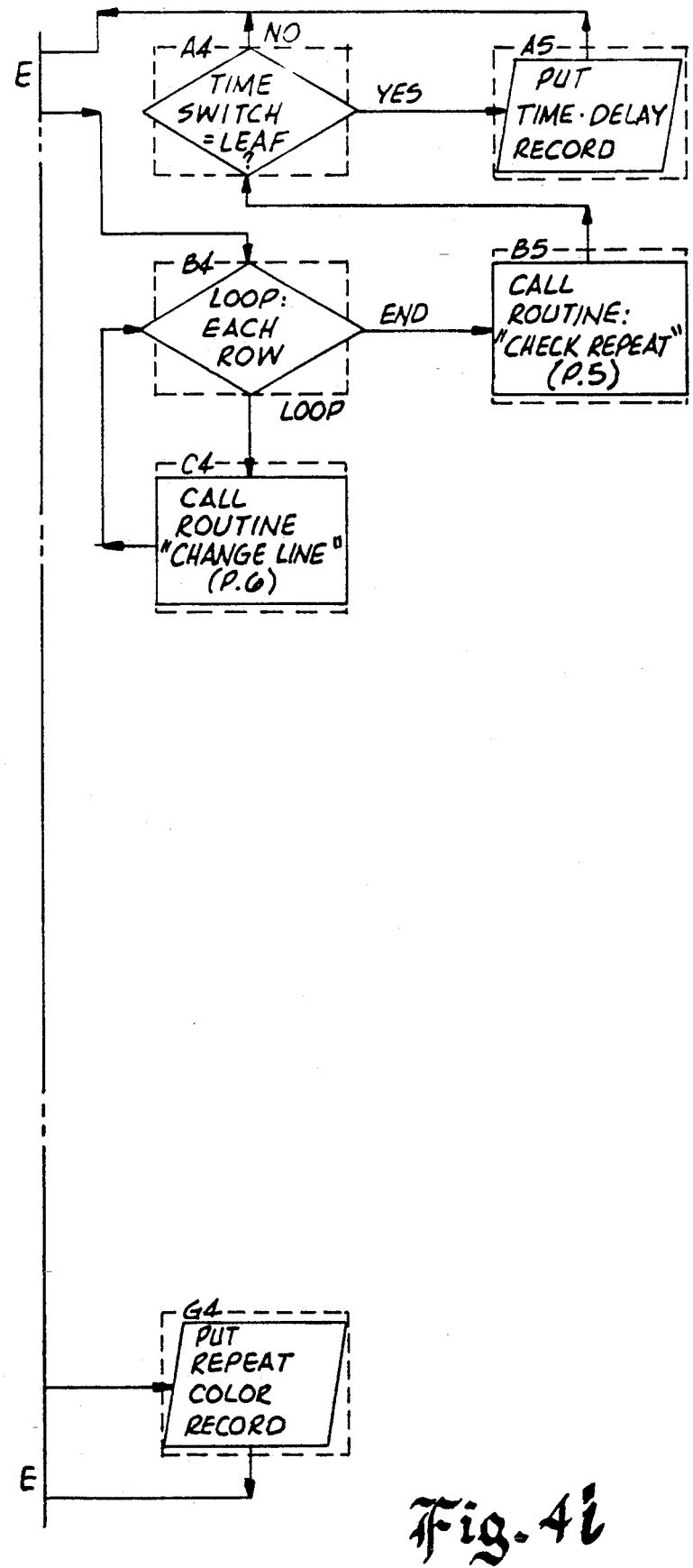

Setting the graphics mode routine 12 and resetting the text mode routine 16 function at the basic machine level, performing the specific function in each case (FIG. 4C and 4H).

Building the animation file routine 14 (FIG. 4C, 4H 4D, 4E, 4J and 4F) occurs based on the contents of the artist's action is initiated and record made. These include: putting text on the image 26; keeping the foreground as background 28; setting timing and other projection controls 30; recording the foreground image 32; clearing the image arrays 34; and merging the background image 36.

Putting text on the image 26 involves writing the appropriate commands E to animation file C, as shown, to place text on the image, in the position and color as instructed by the artist's command file.

Keeping the foreground as background 28 is an operation limited to the developer program. The function exists to provide the artist with greater flexibility in his development of an animation display. Normally, building up a background (via a set of overlaid images) does not cause any screen display to occur; rather the first occurance of a foreground image (which overlays the background image) produces changes on the CRT screen. If, however, the artist wishes the build-up of the background to be visibly evident, then he would start by designating the desired images as foreground. Then when the image build-up is complete, he would give the command to "keep" the "foreground" image (FIG. 3) as a "background", to be subsequently overlaid by the new foreground images.

Projection controls, such as timing, display repetition, and user input are recorded in the function, "set projection timing" 30.

The function "record foreground image" 32 includes four operations (FIG. 2): "get background image" 40, "overlay next foreground image" 42, "note differences from previous images" 44, and "update previous images" 46. The description of "record foreground image" begins with an explanation of the developer program's internal data storage. Four matrices (or arrays) 50, 52, 54, 56 act as screen image storage areas for use by the development program (see FIG. 3).

Matrix 50, "image read from file", contains the current foreground image, ready for use. A separate routine has read the image file D and performed any necessary translations to produce the image matrix.

Matrix 52, "background image", is built through the developer program function, "merge background image" 36, or through the "keep foreground as background" function 28 (see FIG. 2).

Matrix 56, "previous image", contains the previous image that was built up prior to beginning the current image. In effect, the "current" image becomes the "previous" image when completed. The previous image is initialized to be empty at the beginning of operation.

Matrix 54, "current image", is the center of activity. First, the background image is copied into the current image matrix ("get background image", FIG. 2). Second, the new foreground image is overlayed from matrix 50 ("overlay next foreground image", FIG. 2). Third, matrix 54 (the current image) is compared to matrix 56 (the previous image), "note differences from previous image" 44 and "put command to file" 38. The differences are recorded using the record types described on page 16 and 17: type 2, set leaf and row; type 3, set pixel column and color; type 4 repeat previous color for number of times specified. Fourth, matrix 54 is copied into matrix 56 ("update previous image", FIG. 2).

Figure 1:
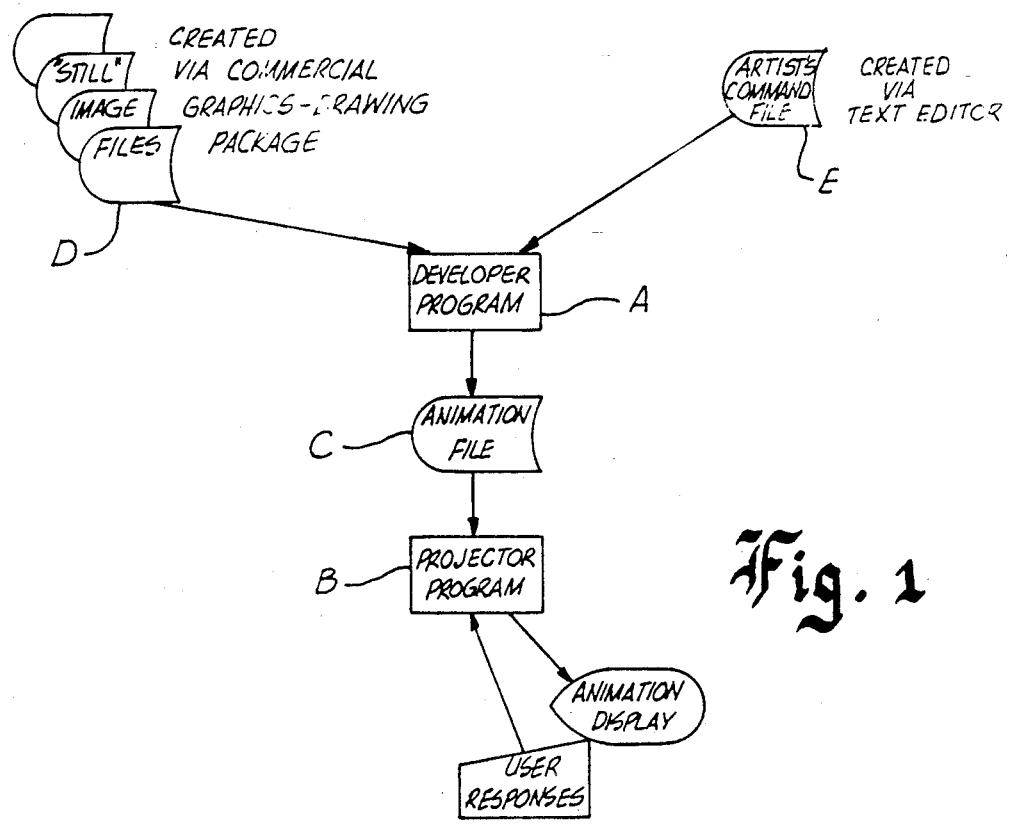
FIG. 1 is a system diagram, describing the relationship of programs and files.
Figure 3:
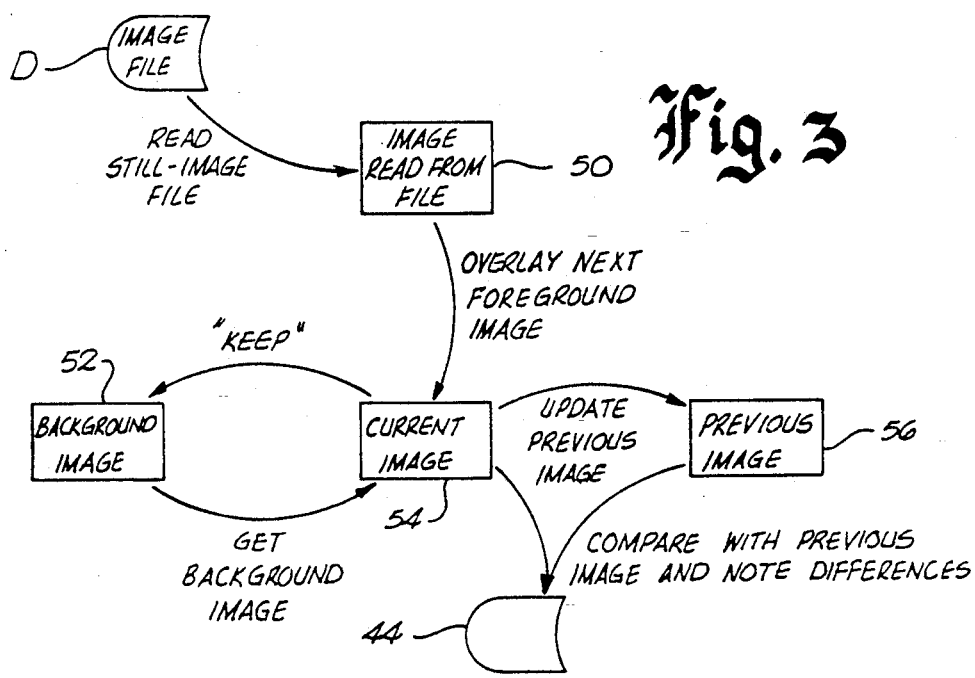
FIG. 3 is a structure chart describing the image-storage areas used by the development program.

Additional functions under "build animation file"14 (FIG. 2) include "clear image arrays" 34, which clears all image storage matrices 50, 52, 54, and 56 (FIG. 3).

The function "merge background image" 36 is used to build up the background image matrix, by overlaying multiple images in a manner described by the artist. In this way, images which the artist drew on separate occasions may be combined (overlayed) in a specific manner.

The command file E includes two types of records, command records and parameter records. All command records are in the format of $n$n, where "n" is a letter. Parameters, if any, are entered on subsequent line(s). Animation may be based on files which are intended for 640×400, 16-color boards. Files also may be converted for use on 640×200, 2-color CGA boards. CGA allows two colors: one is black and the other may be any of the 16 listed below. Sample colors are:

```
 0 = Black
 1 = Blue
 2 = Green
 3 = Cyan
 4 = Red
 5 = Magenta
 6 = Brown
 7 = White
 8 = Grey
 9 = Light Blue
10 = Light Green
11 = Light Cyan
12 = Light Red
13 = Light Magenta
14 = Yellow
15 = Bright White
```

Example of Artist Commands

An example of the commands available for use by the artist in the inputted command file E follow ("*"=changes appear on screen only for these commands):

```
SnSn
  B - background file name(s) follow; if more
      than one file is listed, they are overlaid
  C - * clear the screen to the desired color
  D - top of loop (see $R$R)
  F - * foreground file(s) follow; if more than
      one file is listed, they are shown in
      succession (on background)
  J - "junk color" - consider the specified
      color as the null color, that does not
      overlay other colors (the default is black)
  K - keep the current foreground image as the
      background
  L - timing-delay that follows occurs after
      every LEAF (as compared with $T$T); this
      is useful only for $M$M of 0
  M - display method:
      0 = normal interleave (fastest)
      1 = top-down
      2 = bottom-up (curtain rise)
  P - beep, wait for user to press key (pause)
  R - bottom of loop (see $D$D): if key has
      been pressed, continue (drop out of loop
      else, go back up to top ($D$D), and re-
      show
  T - timing-delay changed to amount that
      follows (in 1/100ths seconds) (default is 0)
  W - * write text - four lines follow:
      1: row, 0 . . . 24
      2: column, 0 . . . 79
      3: attribute: background and foreground
         colors
      4: text to display (max = 80 characters;
         1 line)
  Z - beep, wait for user to press any key, and
      end the projector program with return-code
      set to a standard value that may be tested
      in the batch file after the program ends;
      $Z$Z must be the last line in a command
      file if it is used
```

Other commands may be added, for special conditions relating to the use of specific hardware, and other reasons.

Example Command File

Lists of sequential commands in a file, as might actually be written by an artist, may look like the following:

```
SMSM            SCSC
1               0
SCSC            STST
0               4
SFSF            SMSM
DA2             2
SKSK            SBSB
SDSD            SPORT
SMSM            SFSF
1               H04
STST            SMSM
20              0
SFSF            SFSF
DA21            H03
DA22            H02
SMSM            H01
2               H0
SFSF            H1
DA23            H2
STST            H3
300             H6
SFSF            H7
DA2             H8
SRSR            H9
```

Based on the artists' commands and the corresponding parameters, still-image files D are used to construct the animation file C. FIGS. 4A, 4G and 4B illustrate a flow chart for the validation subroutine which validates the artist's command file E described previously. The subroutine reads the command records to determine if they contain valid command. The parameter records are read to determine if a parameter is specified where required depending on commands. An example of individual commands and their operation is as follows (FIGS. 4A, 4B, 4C, 4D, 4E, 4F, 4G, 4H and 4J):

$B$B: Sets the command status to indicate that the subsequent still-image file name(s) are to be used to build up the background image (FIG. 4C.D3). For each still-image file, the still image is read into an array (FIG. 4D.B2), which array is then compared pixel by pixel to the current background array. For any pixel for which the new array is not set to the junk color (that is, the color which is basically a "place holder", and which does not overlay other colors), the background array is updated with the value of the corresponding pixel color value from the new array (FIG. 4D.D3). Note that for this operation (i.e. while status is "background") the foreground array is actually used to build the background, then copied to the background array later. This allows a greater range of possible operations by the developer (notably, the $K$K command).

$C$C: Clears the arrays (FIG. 4D.C2), puts animation file record: "clear" to color specified (FIG. 4D.E3).

$D$D: Writes animation file record: "top-of-loop" (FIG. 4C.G3).

$F$F: If a background was being built, move it to the background array 52 (FIG. 4C.J1). For each foreground file listed (FIG. 4D.J1); copy background array into current image array 54 (FIG. 4D.J2) and read the specified foreground still-image file into its array 50 (FIG. 4D.J3). For each pixel, if the still-image pixel in the foreground array is not the junk-color (FIG. 4D.G3), put the pixel's color-value into the current image array 54 (i.e. replacing and thus overlaying the background FIG. 4D.F3). The new current image array is now built. The previous image array has been moved to 56**. Depending on the display mode (top-down, curtain-rise, or normal), for the proper order (FIG. 4E.B1), compare each pixel-set of the previous and current foreground images (a pixel-set may be one or more pixels; and pixel-set size is typically the word-size of the particular computer used to maximize the speed of operation FIG. 4F.D2). If pixel-sets of the current image are the same color as the previous pixel-set but are different from the previous image: run the "repeat" color routine if a repeat-previous color status exists, end it, and write the repeat record to the file, FIG. 4F.C2). Take no other action if the current and previous are the same, because unchanged pixel-sets are ignored. If the pixel sets of the current and previous image are different and the pixel-set has the same value as the previous pixel-set of the current image examined (FIG. 4F.D3), increment the repeat occurence value (FIG. 4F.C3), or if the pixel value is new (FIG. 4F.D3), run the "repeat" routine described above (FIG. 4F.E3). If the row or leaf values have changed (FIG. 4F.F3), put a record with the current leaf and row values (FIG. 4F.G3). Put a record with the pixel-set's column and color (FIG. 4F.F4). Update the "old" pixel-set value to the "new" one (FIG. 4F.B3). Put the proper time-delay value record (FIG. 4E.A5 or —.E2)

$JSJ: Set new "junk color" value (FIG. 4DK3); the junk color is the color which, if it occurs in the overlaying image, does not get transferred; the existing color on the overlayed image remains unchanged.

$K$K: Copy the foreground array image to the background (FIG. 4C.J3); allows a background to "fade" in or out, and the changing of part of an image from dynamic to static.

$L$L: Let the timing delay occur after every leaf of an image, rather than after every image (See $TST) (FIG. 4C.K3). Use the timing delay inputted (FIG. 4D.K2).

$M$M: Set display mode (FIG. 4D.D2): normal, which is fastest, displays each leaf of an interleaved image in sequence; top-down, which starts image changes at the top, working down; curtain-rise, the opposite of top-down, gives the impression of a rising curtain.

$P$P: Put a "pause" record (FIG. 4C.J4), which will cause the projector program to "beep" and wait for a key to be pressed to continue.

$R$R: Put record: "bottom of loop" (FIG. 4C.H4); working with a "top of loop" record, will cause the projector to repeat an animation sequence until stopped.

$T$T: Let the timing delay occur after every image, rather than after every leaf (see $L$L) (FIG. 4C.G4); use the timing delay inputted (FIG. 4D.K2).

$W$W: Put records "write text" (FIG. 4D.G4) noting row (FIG. 4D. E2), column (FIG. 4D.F2), color (FIG. 4D.G2), and text (FIG. 4D.H2)

$Z$Z : Put a record "get response" (FIG. 4C.E4).

The structure of amimation file C is optimized to incur the greatest efficiency of storage for the most commonly used record types (such as the set-pixel type). Types used infrequently (such as the loop-control types) may be less efficient, or special cases may be used (such as with text storage for the Write-text type). Minimizing storage size and speed work hand-in-hand to produce faster storage access; this goal, and that of a high speed display, were the criteria for the file structure design.

Animation file C is made up of four-byte records. The first byte describes the record type, except in the case of the text records used by the "write-text" record type. Since the length of the text is given in the first write-text record, enough text records are read to obtain that much text. Thus, the record-type is eliminated as unnecessary for text records, minimizing the file size.

Depending on the first byte indicator, the other contents of a record will vary. Some types will use all three bytes, some may use only two or one, and some may use none. Further optimization is possible, through the grouping of records into super-records that take advantage of the natural buffering techniques of the computer to be used. Thus, all the records of the animation file may be read into the computer memory at first or may be read in large groups of "super" records depending on the file size and computer memory size. This reduces pauses and jerks in the animated display caused by reading the records intermittently simultaneously with the animated display. When using "super" records, the records may be divided into any suitable number. It is not desirable to divide the file in such a manner that empty files will be read. For examle, reading a thousand records at a time as a "super" record when the file only contains twelve hundred records would result in reading eight hundred empty records. In one example, an animation display consisted of an animation file having seventy five thousand records. In this case, "super" records were utilized containing ten thousand records each.

Other considerations may include file input during the animation display. If the file size is kept within the limit of what may be entirely read into main memory, then all input can be accomplished prior to the animation display, eliminating undesirable pauses due to file access. This is also a significant reason for designing the file structure so as to minimize the size of the file. In cases where delays during the animation display area not important, reduction of file access time is still desirable.

The file structure allows enhancements and additions to be made, based on the requirements of specific hardware and for other reasons.

Example of Animated File Structure

The following is an example of the structure for animation file C created and outputted by developer program A, for use by an input to projector program B.

Animation file record types, and their record layouts (records are four (4) bytes in length, the "type" designation is the first byte of each record):

1. Clear CRT to requested color
   Clear color = 2 bytes
   (unused) = 1 byte
2. Set leaf (for interleaved displays) and row values
   Leaf = 1 byte
   Row = 2 bytes
3. Set pixel-set at column specified, to color specified
   Column = 1 byte (for images greater than 225 columns, a multiplicative factor is used)
   Color = 2 bytes
4. Repeat previous color, number of times specified
   Repeat count = 2 bytes -continued (Unused) = 1 byte
5. Change time delay to amount specified
   Delay amount = 2 bytes (100th of a second)
   To slow down the image display, this command sets the delay-size which occurs between successive images
   (Unused) = 1 byte
6. Top of a loop:
   No parameters; works with type 7
7. Bottom of a loop:
   No parameters, works with type 6. Loop is repeated until a key is pressed.
8. Write text to CRT: Crosses multiple records:
   Record (1) - number of characters to display = 1 byte; and row on which to display text = 2 bytes.
   Record (2) - column in which to start text display = 1 byte; and color of text = 2 bytes.
   Record (3) and beyond contain text, four characters per record (i.e. no record type); enough records are used to hold complete text as defined by number of characters in record (1).
9. Pause. wait for user to press key to continue. no parameters.
10. Get Function-key response from user no parameters. optionally used at end of display; waits for user response. Based on response, program exits with a return code that can be used to determine subsequent course of action.

Figure 5:
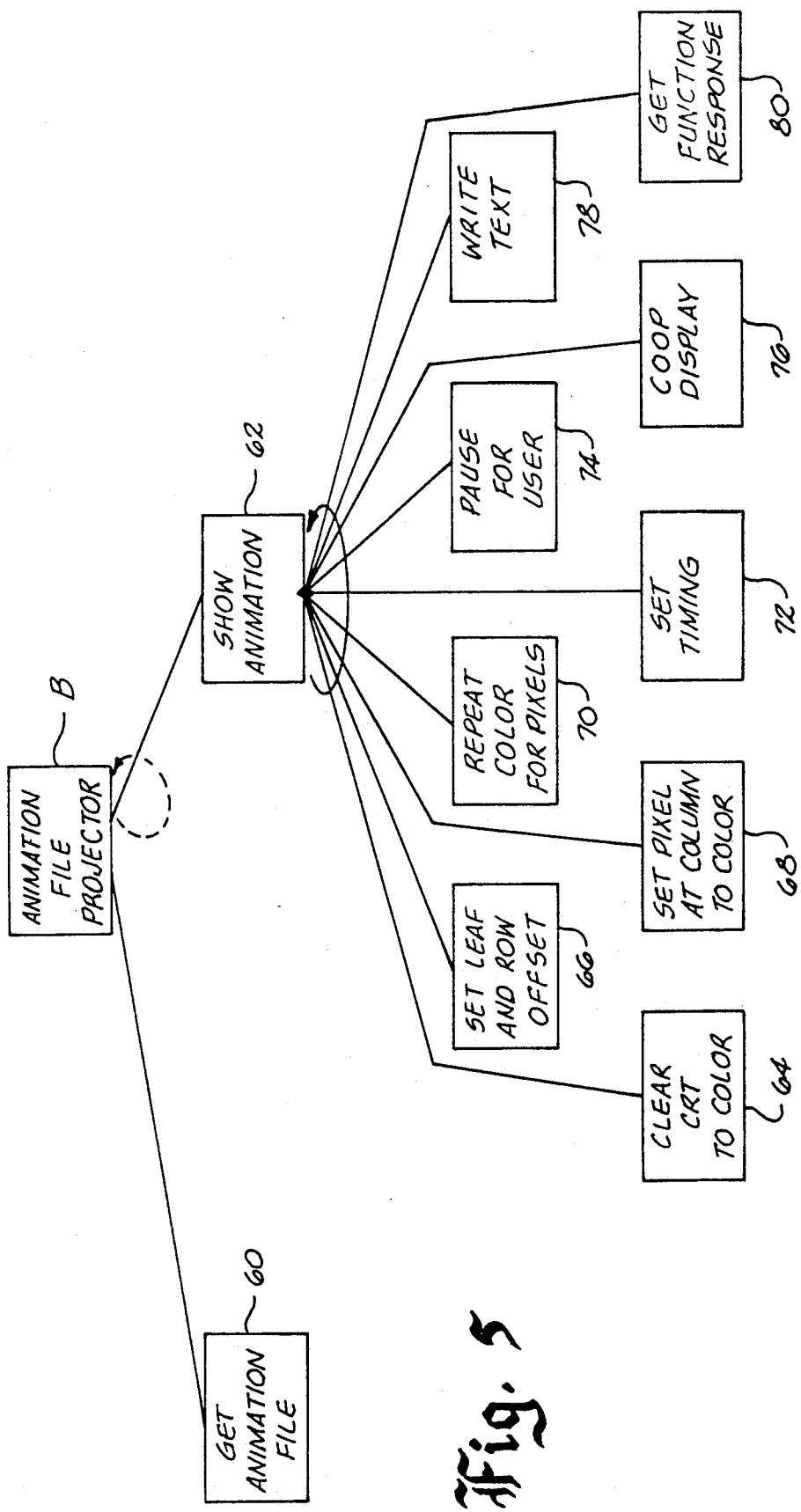
FIG. 5 is a structure chart for the projector program named in FIG. 1.

The structure chart shown in FIG. 5 describes projector program B. The projector function is broken into two parts, "get animation file" 60, and "show animation" 62. Normally, the entire animation file C is read into the high-speed internal computer memory prior to showing the animation, to eliminate pauses in the motion due to access of slow-speed storage devices. The file is then used to control the action of projector program B, showing the desired animation. The various functions control the image screen display and acting on user-input as follows:

"Clear CRT to color" 64 clears the entire image screen, changing all pixels to a single specified color.

"Set leaf and row offset" 66 causes certain locational calculations to occur. These calculations need not occur for every pixel-set, but the values will be used in the calculation of the location of every pixel-set.

"Set pixel at column to color" 68 calculates the location and color of a pixel-set, and causes that pixel-set change to occur. The calculation is based upon the column specified and the offset calculated for "set leaf and row offset" 66.

"Repeat color for pixel-sets" 70 uses the same color as the previously set pixel-set for a number of pixel-sets that immediately follow it in the image storage. The number (count) is specified in the "repeat" record.

"Set timing" 72 causes a pause of the specified length to occur.

"Pause for user" 74 causes the animation projection to stop, until a key is pressed by the person viewing the display.

"Loop display" 76 causes the previous portion of the file to be searched for the loop "top" record, from which point the animation display will continue. However, if a key is pressed, the looping will not occur.

"Write text" 78 causes the specified text to written to the image, at the location and in the color specified.

"Get function response" 80 allows the viewer to type a specific key, indicating the choice among several options as to how to continue.

Figure 6:
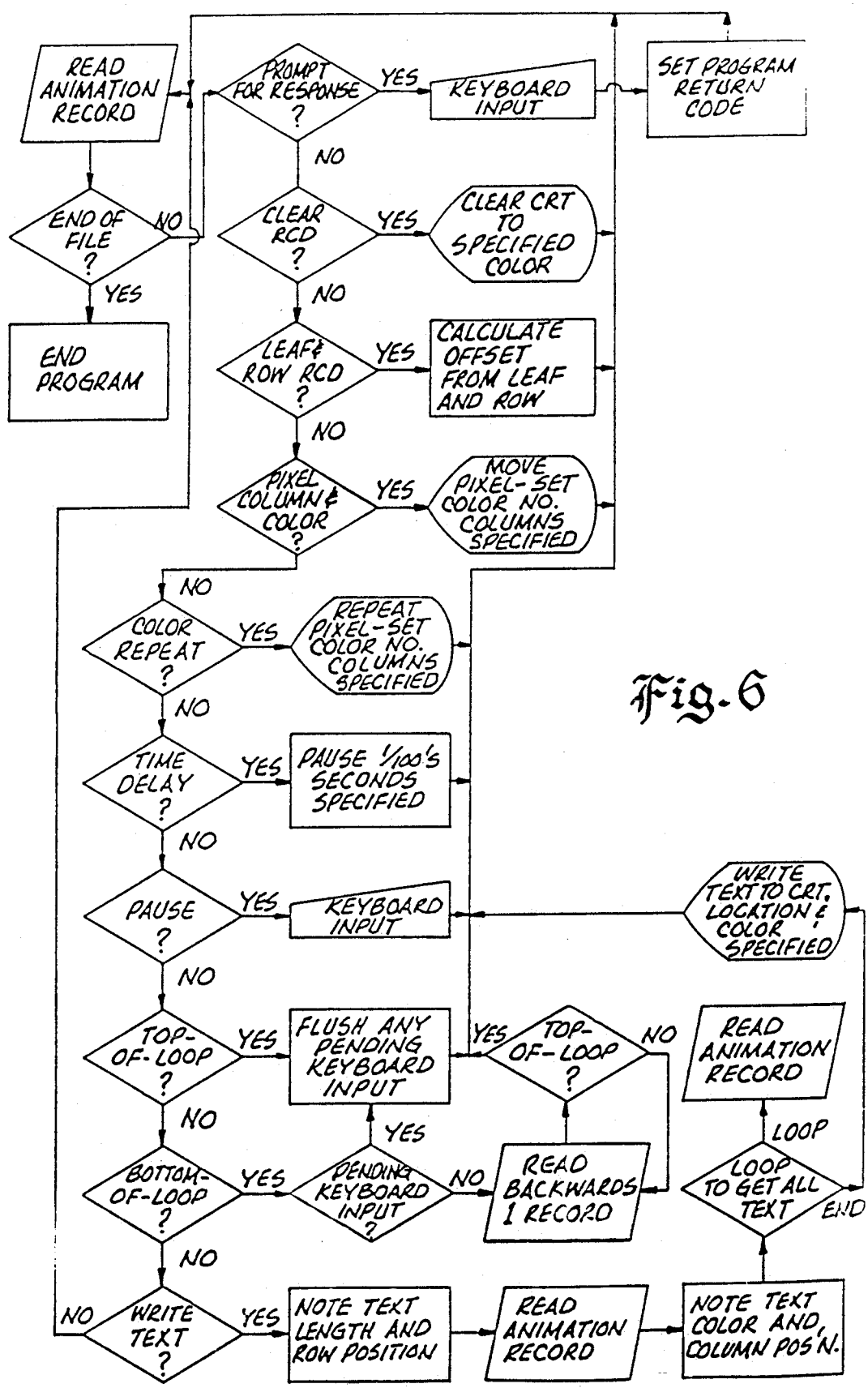
FIG. 6 is a flowchart for the projector program named in FIG. 1.

Referring now in more detail to FIG. 6, a flow chart of the projector program is given wherein the steps in column 2 of the flow chart determine the record type from the animation file. Columns 3, 4, and 5 of the flow chart determine the actions to be taken based on the type record determined. The projector program's operation begins with the accessing of animation file C created by developer program A. After each record is read (FIG. 6.A1), it is first examined for record type. Depending on record type the following operations may be prepared.

Clear record: clears the CRT to the color specified on the record (FIG. 6.B3).

Leaf & Row record: the "offset", a numeric value used elsewhere, is calculated from the leaf (for interleaved displays) and row values (FIG. 6.C3); this method of calculating an offset minimizes the number of calculations required for determining each pixel-set's position, to improve the speed of the animation display.

Pixel Column & Color: the pixel-set (see definition in developer program detailed description) color is placed on the CRT location calculated by adding the offset and the column (FIG. 6.D3).

Color Repeat: using the previous pixel-set's color, it is repeated for the number of times specified, over subsequent pixel-sets (FIG. 6.E3); this takes advantage of the high speed of certain repetitive computer instructions, and reduces the size of the animation file.

Time Delay: delays the animation display, for the specified number of hundredths of a second (FIG. 6.F3); this allows the same animation file to be shown on computers of different speeds, by limiting the number of images displayed per second;

Pause: waits for any keyboard input as a signal to continue (FIG. 6.G3);

Top-of-loop: flushes any waiting keyboard input, in preparation for the Bottom-of-loop record (FIG. 6.H3);

Bottom of loop: checks for waiting keyboard input (FIG. 6.J3); if any exists, it is flushed (FIG. 6.H3), and execution continues with the next record; if no keyboard input is waiting, the animation file is read backwards (FIG. 6.J4) until a Top-of-loop record is found;

Write-text: the text length and row are noted (FIG. 6.K3), the next record is read (FIG. 6.K4), from which the text color and column position are obtained (FIG. 6.K5); then, depending on the text length noted in the previous record, enough records are read (at four characters per record) (FIG. 6.H5) to obtain the complete text (FIG. 6.J5); the text is then written to the CRT, at the specified row, column, and color (FIG. 6.G5); and Prompt-for-response: waits for input from the keyboard; based on the key entered, a particular returncode is set when the program ends, so tht it may be tested for conditional subsequent operation (FIG. 6.A4).

Thus, it can be seen that an advantageous computer system can be had in accordance with the invention for projecting an animated display on a bit-mapped display screen of a computer.

The system includes still image file D containing a set of serial still images having prescribed image differences from one another. Artist command file E contains command records and parameter records for developing the still image file.

Developer program A develops the still image files into animation file C in accordance with the commands and parameters of the artist command file.

Projector program B reads the animation file and projects the animation file to change the display screen and produce the animated display. Developer program A includes means 32 for comparing said image files and determining the pixel color changes from a current and a previous image file until each of the image files of the set has been compared. Means 38 is provided for making a set pixel record containing the different pixel colors between the serial still image files in the set. Developer program A includes means for creating a repeat pixel record for repeating the color of a previously set pixel for a number of pixels that immediately follow it in the image.

Animation file records have a size of four bytes and the first byte of the records specifies the record type so that the structure of the animation file is optimized for the greatest storage efficiency and speed. Text records 26 include a first record specifying the type of record and number of characters to be displayed in the text, a second record specifying the location. and three or more subsequent records containing said characters of the text.

In a preferred embodiment, still image files include foreground image files and background image files. Developer program A includes means for storing a background image 52, overlaying a foreground image onto said background image 42 to create a current foreground image 54, comparing said current foreground image to a previous foreground image 44. and developing set pixel records containing the differences in the colors of said pixels in a manner that the pixels in said current foreground image which are different replace the color of the pixels in the previous foreground image sequentially in the animated display.

While a preferred embodiment of the invention has been described using specific terms, such description is for illustrative purposes only, and it is to be understood that changes and variations may be made without departing from the spirit or scope of the following claims.

What is claimed is:

1. A method of producing an animated display on a bit-mapped display screen of a personal computer system and the like comprising:
   (a) creating a set of successive serial still images which successively make up said animated display wherein each next successive still image contains slight differences from the previous still image;
   (b) creating individual still image files which contain binary digit data for each of said successive still images in said set and storing said still image files in a computer accessible memory;
   (c) inputting an artist's command file written in a computer programming language into said computer which contains commands and command parameters for processing said still image data files, and executing said artist command file in said computer as a stored computer program;
   (d) developing an animation data file by processing said still image files in response to said commands and command parameters of said artist's command file to generate in said animation data file a plurality of set-pixel records containing binary digit data which represents the differences in pixels between said successive still image files and sets pixel colors at prescribed pixel locations in accordance with said differences between said successive still images. and a plurality of projection records containing binary digit data for timing and sequencing said pixel color changes for projecting said set-pixel records of said animation data file on said display screen in a prescribed sequence;
   (e) storing said animation data file in computer accessible memory: and
   (f) reading said animation data file and changing said locations and colors of pixels to produce said animated display in accordance with said animation data file.

2. The method of claim 1 including:
   (a) developing said set-pixel records in said animation data file by comparing a current still image file to a previous still image file and recording the changes in the colors of the pixels in said set-pixel record; and
   (b) comparing each said still image file of said set as in step (a) wherein the current image file, once compared, becomes the next previous image file until all said still image files in said set are compared and a set-pixel record made.

3. The method of claim 1 including:
   (a) designating a number of said still image files as background files which are static in said animated display and a number of said still image files as foreground files which are dynamic in said animated display; and
   (b) overlaying a first foreground image file on a background image file to produce a previous image file;
   (c) overlaying a second foreground image file on said background image file to produce a current image file; and
   (d) comparing said current image file to said previous image file and putting the differences in pixel colors between said respective images in said set-pixel record; and
   (e) repeating steps (b)-(d) until the series of said foreground images have been compared and the pixel color changes put in said set-pixel records.

4. The method of claim 1 including developing said animation data file by developing animation file records having a fixed size of four bytes optimized for compactness, data content and command content, to efficiently utilize machine memory providing a rate of pixel change which produces animation.

5. The method of claim 4 comprising assigning the first byte of said records as the type of record, and specifying the parameter in the other bytes.

6. The method of claim 1 including developing said animation data file by designating said still image files either as background image files or foreground image files and projecting said background image files in a non-changing manner while projecting said foreground image files in a changing manner to produce animated display.

7. The method of claim 6 including building a background by reading each background image file into a background array, comparing a previous background array, pixel by pixel, to a current background array, updating the previous background array by replacing the pixel colors in the previous background array with the colors which are different in the current background array.

8. The method of claim 7 including:
   (a) copying said background into a foreground array;

(b) reading a foreground image file into said foreground array and designating said array as a current foreground array;

(c) comparing the pixel colors of the current foreground array to a previous foreground array; and (d) repeating steps (b) and (c) until all the foreground image files have been read and compared and the changes in pixel colors put in said set-pixel records.

9. The method of claim 8 including:

(a) developing a pixel repeat record if the pixels at consecutive memory locations of the compared foreground arrays are to be changed to the same color; specifying the number of repetitions of said pixels in said pixel repeat record; repeating the same color as said pixel in the previous location, and starting said repetition at a location immediately following said previous location.

10. The method of claim 8 wherein said pixels of said foreground arrays are compared in pixel sets of two or more pixels.

11. The method of claim 10 including writing repeat pixel color records for consecutive pixel sets which are the same in said current foreground array and writing new set-pixel records for the pixel-sets that are different.

12. The method of claim 6 including designating one of said colors in the computer system as a junk color, creating said background images on said junk color, building up said background array by overlaying successive background images, determining the changes in pixel colors of successive images, replacing the color of said pixels in a previous background with the colors in a current background image, and keeping the pixel color of said previous background image where the color in the current background image is said junk color.

13. The method of claim 6 including designating a plurality of background images as foreground images in said command file, keeping said foreground images as background, and displaying said foreground images to produce a visibly evident dynamic background during display.

14. The method of claim 1 including reading said animation data file into memory prior to initiating said animated display.

15. The method of claim 14 including grouping a number of said set-pixel records into record groups and reading said animation data file by intermittently reading said record groups so that pauses which disrupt the normal motion of the animation due to file accessing are minimized.

16. The method of claim 1 including developing an animation data file which contains text records containing prescribed location and characters for text.

17. The method of claim 16 wherein developing said text records include specifying the record type in a first record and placing the text characters in one or more subsequent records.

18. The method of claim 17 wherein developing said text records includes indicating in a first record that the record and a prescribed number of subsequent records are text type records and developing the subsequent records to include said text until a prescribed number of text characters are recorded as specified by said first record.

19. The method of claim 18 including developing said first record to indicate text record type, number of characters to display, and the row on which to begin text display, developing a second record specifying the column in which to start the text display and the color of the text, and developing at least a third record containing only the text characters.

20. The method of claim 16 including developing projector command records in said animation data file which contain commands for controlling the projection of said pixel records and text records in said display.

21. The method of claim 20 including projecting said set-pixel and text records in loops from top to bottom.

22. The method of claim 21 including clearing said display screen prior to beginning said animation display to a prescribed color.

23. The method of claim 20 including controlling the amount of time delay between successive images.

24. The method of claim 20 including developing a pause command which creates a pause in said animation display for entry into said computer of user commands entered by a viewer of said animated display.

25. A method for producing an animated display on a bit-mapped display screen of a programmable computer system having a personal computer comprising the steps:

(a) initially storing in a computer accessible memory an animation data file which includes a plurality of set-pixel records containing binary digit data which sets pixel color changes at prescribed pixel locations on said display screen in accordance with prescribed differences between successive still images of said animated display, text records containing binary digit data specifying textural characters at prescribed colors and locations in said display, and a plurality of projection records containing binary digit data for timing and sequencing said pixel color changes for projecting said set-pixel records and said text records of said animation data file on said display screen in a prescribed sequence;

(b) inputting said animation data file to a projector program in said computer which reads said set-pixel records, text records, and projection records; and (c) reading said animation data file in said computer to repeatedly and sequentially change individual prescribed pixels of an existing display to produce said animated display in accordance with said animation data file records.

26. The method of claim 25 including setting said pixels by setting the color and location of said pixels.

27. The method of claim 26 including setting said pixels by sets of pixels and repeating the color a plurality of specified times over subsequently specified pixel sets to reduce the size of the animation data file and increase the speed of the animated display.

28. The method of claim 25 including projecting a prescribed number of said animation file records per second on said display screen.

29. The method of claim 25 including momentarily interrupting said animated display for keyboard input by the viewer of user commands.

30. The method of claim 25 including projecting said pixel and text records in a loop from the top to the bottom of said display screen.

31. The method of claim 25 including storing and projecting said animation file records in files consisting of four bytes and specifying the type of record in the first byte of said records.

32. The method of claim 25 including changing the colors of said pixels in an interleaving manner to speed up said display.

33. A method of operating a personal computing system having a personal computer to produce an animated display on a bit-mapped display screen of the computing system comprising:
  (a) creating a set of serial still images having prescribed changes from one another;
  (b) storing said still images in the form of binary digit data corresponding to individual serial still image files in a computer accessible memory;
  (c) inputting an artist's command file in a computer programming language into said computer containing commands and parameters for developing said still image files, and executing said artist command file in said computer as a stored computer program;
  (d) developing said still image files in said computer by building and comparing a current composite image which includes a plurality of current still images with a previous composite image which includes a plurality of previous still images in accordance with the commands and parameters of said artist's command file and making set-pixel records of the differences in color between the pixels of said current and previous composite images;
  (e) updating and converting the current composite image to a previous composite image and building the next current composite image as a new current image and repeating step (d) until all of the still images in said set have been composed and compared sequentially;
  (f) creating an animation data file which includes said set-pixel records containing binary digit information corresponding to pixel change instructions; and
  (g) inputting said animation data file into a projector program in said computer which changes the pixel colors on said display screen and produces said animated display in accordance with said animation data file.

34. The method of claim 33 wherein said projector system reads said set-pixel records of said animation data file sequentially and changes only the pixels on the display screen which are different from the preceding image in accordance with said pixel change instruction of said animation file.

35. The method of claim 34 wherein said artist's command file includes command records which contain commands which the developer system follows and parameter records which specify perameters for the commands.

36. The method of claim 34 wherein said animation files data consist of a series of animation file records which are fixed in size and include four operable bytes of information to standardize operation of said projector program to improve speed and minimize storage for more rapid deployment of the animated display.

37. A system for projecting an animated display on a bit-mapped display screen of a computer system having a personal computer comprising:
  (a) a set of still image files containing serial still images having prescribed successive image changes from one another;
  (b) an artist command file for storage in said computer written in a computer programming language containing command records and parameter records for developing the still image files;
  (c) a developer program for developing said still image files into an animation data file which includes set pixel records containing binary digit data corresponding to pixel changes between successive still image files and text records containing binary digit data specifying textural characters in said display developed in accordance with said commands and parameters of said artist command file; and
  (d) a projector program for reading said animation data file and changing the pixel colors on said display screen to produce said animated display in accordance with said animation data file.

38. The system of claim 37 wherein said developer program includes means for comparing said still image files and determining the pixel color changes from a previous and to a current image file and means for making set-pixel records containing the changes of said pixel colors for said files in said set.

39. The system of claim 38 wherein said developer program includes means for creating a repeat pixel record for repeating the color of a previous pixel for a number of pixels that immediately follow it in said image file.

40. The system of claim 38 wherein said still image file includes foreground image files and background image files; and said developer program includes developer means for storing a background image, overlaying a foreground image onto said background image to create said current foreground image, comparing said current foreground image to said previous foreground image, and developing set-pixel records containing the differences in the colors of said pixels so that the pixels in the projected animation which are different will be changed.

41. The system of claim 40 wherein said developer further includes means for overlaying a plurality of said background images to develope said background image.

42. The system of claim 40 wherein said development program includes developer means for overlaying a foreground image onto said background image and keeping said overlayed image as the new background image.

43. The system of claim 37 wherein said animation file records have a fixed size of four bytes and the first byte of said records indicates a type of record so that the structure of the animation data file is optimized for the greatest storage efficiency and speed.

44. The system of claim 37 wherein said set pixel record files contain the location and color of the pixels of said display.

45. The system of claim 37 wherein said text records include a first record specifying the type of record and number of characters to be displayed in the text, a second record specifying the location, and three or more subsequent records containing said characters of said text.

46. A system for projecting an animated display onto a bit-mapped display screen of a computer comprising:
  (a) an animation data file containing a series of set pixel records containing binary digit data which sets pixel color changes at prescribed pixel locations on said display screen in accordance with prescribed differences between successive still images which comprise said animated display displayed on said display screen, and a plurality of projection records containing binary digit data which controls the timing and repetition of said set pixel records; and (b) a projector program for sequentially reading said set pixel records of said animation data file in said computer and for projecting said pixel color changes to repeatedly change an existing display screen to produce an animated display in accordance with said animation data file.

47. The system of claim 45 wherein said animation data file includes text records containing the color and position of text characters to be displayed on said display screen with said pixel records so that said projector program produces said animated display with text in said color and at said position at a specified time.

* * * * *